(12) United States Patent
Renner et al.

(10) Patent No.: US 7,309,675 B1
(45) Date of Patent: Dec. 18, 2007

(54) METHOD FOR REGENERATING PLATINUM CATALYSTS

(75) Inventors: Hermann Renner, Stockach (DE); Hans Herzog, Badenweiler-Lipburg (DE)

(73) Assignee: Degussa AG, Düsseldorf (DE)

( * ) Notice: Subject to any disclaimer, the term of this patent is extended or adjusted under 35 U.S.C. 154(b) by 927 days.

(21) Appl. No.: 10/030,224

(22) PCT Filed: Jul. 5, 2000

(86) PCT No.: PCT/EP00/06301

§ 371 (c)(1),
(2), (4) Date: Apr. 23, 2002

(87) PCT Pub. No.: WO01/14058

PCT Pub. Date: Mar. 1, 2001

(30) Foreign Application Priority Data

Aug. 24, 1999 (DE) .................................. 199 40 127
Aug. 25, 1999 (DE) .................................. 199 40 459

(51) Int. Cl.
*B01J 20/34* (2006.01)

(52) U.S. Cl. ....................................................... 502/27

(58) Field of Classification Search .................. 502/20, 502/27–29, 38
See application file for complete search history.

(56) References Cited

U.S. PATENT DOCUMENTS

| 5,279,802 A | * | 1/1994 | Clough | ......................... 423/22 |
| 5,279,803 A | * | 1/1994 | Clough | ......................... 423/22 |
| 5,280,004 A | * | 1/1994 | Iino et al. | .................... 502/314 |

FOREIGN PATENT DOCUMENTS

| EP | 0 611 126 | 11/1998 |
| GB | 922 021 | 3/1963 |
| GB | 975 730 | 9/1964 |
| GB | 1 090 294 | 9/1967 |

OTHER PUBLICATIONS

English translation of International Preliminary Examination Report (Form PCT/IPEA/409).

* cited by examiner

*Primary Examiner*—Edward M. Johnson
(74) *Attorney, Agent, or Firm*—Smith, Gambrell & Russell LLP

(57) ABSTRACT

The regeneration of platinum group metal suspension catalysts involves a dissolution step using HCl and an oxidant, such as $Cl_2$ or $H_2O_2$, and a precipitating step carried out in the presence of a reducing agent, especially an aldehyde, an HCOOH or a formate. According to the invention, the content of non-platinum metals which are dragged into the catalyst as a result of the method can be reduced by carrying out the precipitation in the presence of a chelate complexing agent for one or more metals selected from the series of metals of groups 2a, 3a, 4a of the periodic table and of the transition elements without elements of the platinum group.

13 Claims, No Drawings

METHOD FOR REGENERATING PLATINUM CATALYSTS

DESCRIPTION

The invention relates to a process for the regeneration of platinum group metal catalysts, particularly Pd blacks, and supported Pd catalysts. Regeneration comprises dissolution of the spent catalyst by oxidation and precipitation using a reducing agent.

It is well known that suspension catalysts with one or more platinum group metals as the active catalyst component may be deactivated by chemical, mechanical or thermal influences and have to be regenerated in view of the cost of noble metals. The term suspension catalysts is used hereinafter to mean both supported and unsupported catalysts whose catalytically active main component comprises one or more platinum group metals. In addition, however, the catalysts may contain one or more other elements or element compounds for the purpose of modifying the catalyst, for example, for influencing the selectivity and/or activity. Known processes for regeneration can be used for regenerating both unsupported noble metal blacks and supported suspension catalysts. The main difference lies in the fact that the process for regenerating supported catalysts necessarily includes a filtration step for separating the support.

Industrially important hydrogenation reactions, for example, the hydrogenation stage in the anthraquinone process for the preparation of hydrogen peroxide, can be carried out both with the use of unsupported, substantially palladium-containing catalysts, hereinafter known as palladium blacks, and with the use of supported catalysts containing substantially palladium as the active main component.

If suspension catalysts containing noble metals are used, an enrichment of various other metals or metal compounds readily occurs during continuous operation. This foreign matter is brought into the system with the raw materials in the form of very slight contamination and/or stems from abrasion of the material of the plant in which the reaction takes place. Such an increase in non-noble metals in platinum group metal suspension catalysts can be observed during the hydrogenation stage of the so-called anthraquinone process for the preparation of hydrogen peroxide: if a hydrogenation reactor made of a conventional refined steel is used, the iron, chromium and nickel content, for example, rises in the noble metal-containing catalyst. In order to be able to maintain constant operating conditions in the system it is therefore desirable to keep the content of non-platinum metals in the system as a whole constant, if possible. The object of the present invention is, therefore, to show a process for carrying out the regeneration of a platinum group metal suspension catalyst in such a way that non-platinum group metals entrained into the hydrogenation process are removed at least partially from the catalyst.

In the prior art, the platinum group metal(s) is (are) dissolved in hydrochloric acid in the presence of an oxidising agent and converted to the corresponding chloride(s) in order to regenerate a platinum group metal suspension catalyst. Dissolution of the noble metal is necessarily followed by a filtration stage in the case of supported catalysts, in order to separate the support; in the case of unsupported catalysts, filtration is required only if necessary. The noble metal chloride solution obtained is then used to prepare the catalyst, the noble metal being precipitated by means of a reducing agent in the presence or absence of a support material. The pH is usually shifted from the strongly acid to the moderately basic range during precipitation. Known reducing agents for precipitating the noble metal are formaldehyde, formic acid and elemental hydrogen. By way of example, reference is made to GB patent 922,021 wherein the process outlined above is described, with the use of $HCl/Cl_2$ for dissolving palladium from a palladium-containing supported catalyst and the use of formaldehyde as reducing agent for precipitating palladium in the presence of a fresh support material. Under the precipitation conditions, the non-platinum group metals usually introduced with the catalyst, such as iron, chromium and nickel, are co-precipitated with the palladium in the form of a hydroxide and/or carbonate.

In order to separate the non-platinum group metals from the aqueous solution containing platinum group metal chloride, the platinum group metal was precipitated hitherto by adding a more electropositive metal than the platinum group metal to be precipitated, such as, in particular, iron or zinc. The platinum group metal precipitated in this way is separated from the solution. As the catalytic activity of the noble metal thus obtained is insufficient, this first precipitation step (cementation) must be followed by another dissolution of the platinum group metal and precipitation under conditions that allow a very fine-particle and hence active catalyst to be obtained. The fact of having to dissolve and precipitate the platinum group metal twice is technically complicated, so experts are interested in a simpler process.

A process was found for the regeneration of a supported or unsupported suspension catalyst based on at least one platinum group metal, comprising dissolution of the platinum group metals present in aqueous HCl, using an oxidising agent for platinum group metals, filtration of insoluble constituents and precipitation of the platinum group metals by means of a reducing agent at a pH in the range from 2 to 10, which is characterised in that precipitation is carried out in the presence of a chelating agent for one or more metals of the series of metals of groups 2a, 3a, 4a of the periodic system, and transition elements.

The process according to the invention is directed preferably at suspension catalysts which contain, as the active components, at least 50 wt. % of palladium, less than 50 wt. %, preferably 0.01 to 10 wt. % of one or more other platinum group metals and 0.001 to 10 wt. % of non-platinum group metals which may also be present in the form of compounds. The invention is directed particularly preferably at the regeneration of platinum group metal blacks, particularly palladium black, this term always also including the presence of other platinum group metals and, to a minor extent, other modifying metals.

Due to the presence of a chelating agent during the precipitation of the one or more platinum group metals, non-platinum group metals capable of forming complexes are kept wholly or partially in solution so that the content of these metals in the precipitated platinum group metal suspension catalyst is reduced. The chelating agent is used in an effective amount in this case, particularly in an at least stoichiometric amount and preferably in a more than stoichiometric amount, based on the metals to be separated.

In theory, any chelating agents which are sufficiently stable and effective under the reaction conditions of precipitation may be used. The chelating agents are preferably compounds from the series comprising aminopolycarboxylic acids, polyhydroxycarboxylic acids and aminopolyphosphonic acids and water-soluble salts thereof. Particularly effective chelating agents are compounds from the series comprising iminodiacetic acid, nitrilotriacetic acid, ethylenediamine tetraacetic acid, diethylenetriamine pentaacetic acid, amino-tri(methylenephosphonic acid), ethylenediamine tetra(methylenephosphonic acid), diethylenetriamine penta(methylenephosphonic acid), hydroxymethane diphosphonic acid, tartaric acid, citric acid, polyoxycarboxylic acids (POC), polyacrylic acids and water-soluble salts of the acids mentioned.

Apart from chlorine mentioned in GB 922,021, bromine and particularly hydrogen peroxide are also suitable for dissolving platinum group metals (see EP-B 0 611 126).

Reducing agents from the series comprising aldehydes, particularly formaldehyde, and formic acid or a formate are used to precipitate platinum group metals in the presence or absence of a support material in a catalytically highly active form. Active catalysts can also be obtained using a hydride or complex hydride, such as sodium boranate, and with elemental hydrogen.

The precipitation of the platinum group metal carried out in the presence of a chelating agent according to the invention usually takes place at a pH in the range from about 2 to about 10. The pH is preferably increased during precipitation. According to a particularly preferred embodiment, the addition of the reducing agent is commenced at a pH in the range from 2 to 3, and the pH is raised continuously or in stages during the addition of further reducing agent, particularly to a final pH in the range from 8 to 9.

It was ascertained that catalysts with greater activity are obtained by precipitation of the platinum group metal in the presence of a chelating agent than by precipitation in the absence of a chelating agent.

As may be derived from the tests below on the basis of the regeneration of spent palladium black from two production plants for the preparation of hydrogen peroxide by the anthraquinone process, elements such as aluminium, iron, chromium and nickel can be complexed successfully under the precipitation conditions. Using the chelating agents according to the examples, copper and mercury can be complexed and kept in solution only very incompletely, however.

EXAMPLES

The process according to the invention was examined using palladium black discharged from the hydrogenation stage of two plants for the preparation of hydrogen peroxide by the anthraquinone process.

Regeneration took place as follows:

The Pd black discharged was dissolved with hydrochloric acid (4-8 ml of HCl (32 wt. %) per g of Pd) and $H_2O_2$ (1-3 ml of $H_2O_2$ (40 wt. %) per g of Pd) and the palladium chloride solution obtained was filtered to remove solids. The palladium chloride solution containing hydrochloric acid with a Pd content from 5 to 20 g/l was heated under a nitrogen atmosphere to 70° C. to 80° C. and ethylenediamine tetraacetic acid (0.5 g per g of Pd) was added as chelating agent. A pH of about 3 was obtained by adding sodium hydroxide solution and a partial amount of formic acid (0.1-0.2 ml of HCOOH per g of Pd) was then added. The pH was then adjusted with sodium hydroxide solution to about 9 and more formic acid (0.3 to 0.6 ml of HCOOH per g of Pd) was added for the quantitative precipitation of Pd. The precipitated palladium was washed with water to remove the chloride and filtered by suction.

The samples of the spent and regenerated Pd blacks were washed with acetone to remove adhering solvent and water residues, and dried. The impurity elements were determined by ICP spectroscopy. The results (details in wt. %, based on Pd) can be derived from the table.

|         | 1.1. Example 1 | | 1.2. Example 2 | |
|---------|---------------|----|---------------|----|
| Element | 1.3. regenerated Pd black "r 1" | 1.4. spent Pd black "g 1" | 1.5. regenerated Pd black "r 2" | 1.6. spent Pd black "g 2" |
| Al (%) | <0.005 | 0.21 | 0.007 | 0.04 |
| Ce (%) | <0.005 | <0.005 | <0.005 | <0.005 |
| Co (%) | <0.005 | <0.005 | <0.005 | <0.005 |
| Cr (%) | <0.005 | 0.17 | <0.005 | 0.012 |
| Cu (%) | 0.46 | 0.45 | 0.036 | 0.04 |
| Fe (%) | 0.007 | 0.42 | 0.012 | 0.03 |
| Hg (%) | 2.3 | 2.6 | 0.17 | 0.12 |
| La (%) | <0.01 | <0.01 | <0.01 | <0.01 |
| Mn (%) | <0.002 | 0.007 | <0.002 | <0.002 |
| Ni (%) | <0.005 | 0.042 | <0.005 | <0.005 |
| Ti (%) | <0.002 | <0.002 | <0.002 | <0.002 |
| Zr (%) | <0.001 | <0.001 | <0.001 | <0.001 |

It follows from the table that Hg and Cu are contained in the catalyst before and after regeneration, that is, they are complexed only to a minor extent.

The Al, Cr, Fe and Ni content in the spent samples "g 1" and "g 2" is markedly above the values exhibited by the regenerated Pd blacks "r 1" and "r 2". The elements mentioned remain in the solution during the precipitation of Pd and are thus separated from the catalyst. Fe, Cr and Ni originate from the refined steel of apparatus with which the working solution comes into contact in the course of the $H_2O_2$ process. Al originates from $Al_2O_3$, which is used in the regeneration of the working solution.

The invention claimed is:

1. A process for the regeneration of a supported or unsupported suspension catalyst based on at least one platinum group metal, comprising dissolution of the platinum group metals present in aqueous HCl, using an oxidising agent for platinum group metals, filtration of insoluble constituents and precipitation of the platinum group metals by means of a reducing agent at a pH in the range from 2 to 10,
    characterised in that
    precipitation is carried out in the presence of a chelating agent for one or more metals from the series of metals of groups 2a, 3a, 4a of the periodic system and transition elements.

2. A process according to claim 1,
    characterised in that
    an unsupported catalyst based on at least 50 wt. % of palladium, 0 to less than 50 wt. % of one or more other platinum group metals and 0.001% to 10 wt. % of at least one metal capable of forming complexes from the series of groups 2a, 3a, 4a of the periodic system and transition elements without elements of the platinum group is regenerated by carrying out precipitation in the presence of an at least stoichiometric amount of a chelating agent and moreover at least one of the non-platinum group metals present.

3. A process according to claim 1,
    characterised in that
    the oxidising agent used is chlorine or hydrogen peroxide and the reducing agent used is an aldehyde, particularly formaldehyde, a formate or formic acid, a hydride or hydrogen.

4. A process according to claim 1,
    characterised in that
    the chelating agent is selected from the group consisting of aminopolycarboxylic acids, polyhydroxycarboxylic acids and aminopolyphosphonic acids.

5. A process according to claim 4,
characterised in that
the chelating agent is selected from the group consisting of iminodiacetic acid, nitrilotriacetic acid, ethylenediamine tetraacetic acid, diethylenetriamine pentaacetic acid, aminotri(methylenephosphonic acid, ethylenediamine tetra(methylenephosphonic acid), diethlyenetriamine penta(methylenephosphonic acid), hydroxymethane diphosphonic acid, tartaric acid, citric acid, polyoxycarboxylic-acids (POC) and water-soluble salts of the acids.

6. A process according to claim 1,
characterised in that
precipitation of the platinum group metal(s) is carried out with a reducing agent selected from the group consisting of formaldehyde, formate and formic acid, the pH being raised continuously or in stages from 2 to 3 to 8 to 9 during the addition of the reducing agent.

7. A process according to claim 2,
characterised in that
the oxidising agent used is chlorine or hydrogen peroxide and the reducing agent used is an aldehyde, particularly formaldehyde, a formate or formic acid, a hydride or hydrogen.

8. A process according to claim 2, characterised in that
the chelating agent is selected from the group consisting of aminopolycarboxylic acids, polyhydroxycarboxylic acids and aminopolyphosphonic acids.

9. A process according to claim 3, characterised in that
the chelating agent is selected from the group consisting of aminopolycarboxylic acids, polyhydroxycarboxylic acids and aminopolyphosphonic acids.

10. A process according to claim 2,
characterised in that
precipitation of the platinum group metal(s) is carried out with a reducing agent selected from the group consisting of formaldehyde, formate and formic acid, the pH being raised continuously or in stages from 2 to 3 to 8 to 9 during the addition of the reducing agent.

11. A process according to claim 3,
characterised in that
precipitation of the platinum group metal(s) is carried out with a reducing agent selected from the group consisting of formaldehyde, formate and formic acid, the pH being raised continuously or in stages from 2 to 3 to 8 to 9 during the addition of the reducing agent.

12. A process according to claim 4,
characterised in that
precipitation of the platinum group metal(s) is carried out with a reducing agent selected from the group consisting of formaldehyde, formate and formic acid, the pH being raised continuously or in stages from 2 to 3 to 8 to 9 during the addition of the reducing agent.

13. A process according to claim 5,
characterised in that
precipitation of the platinum group metal(s) is carried out with a reducing agent selected from the group consisting of formaldehyde, formate and formic acid, the pH being raised continuously or in stages from 2 to 3 to 8 to 9 during the addition of the reducing agent.

* * * * *